United States Patent
Del Prato et al.

(10) Patent No.: US 7,371,313 B2
(45) Date of Patent: May 13, 2008

(54) ON-SITE GENERATION, PURIFICATION, AND DISTRIBUTION OF ULTRA-PURE ANHYDROUS AMMONIA

(75) Inventors: Thomas A. Del Prato, Katy, TX (US); Harold G. Spicer, Centerville, OH (US)

(73) Assignee: Matheson Tri-Gas, Inc., Longmont, CO (US)

( * ) Notice: Subject to any disclaimer, the term of this patent is extended or adjusted under 35 U.S.C. 154(b) by 287 days.

(21) Appl. No.: 11/130,505

(22) Filed: May 17, 2005

(65) Prior Publication Data

US 2005/0260108 A1 Nov. 24, 2005

Related U.S. Application Data

(60) Provisional application No. 60/572,256, filed on May 18, 2004.

(51) Int. Cl.
- *C25B 1/00* (2006.01)
- *C01C 1/02* (2006.01)
- *C01C 1/04* (2006.01)
- *C01C 1/08* (2006.01)

(52) U.S. Cl. .................. 205/552; 422/148; 423/352; 423/358; 423/359

(58) Field of Classification Search ................ 423/352, 423/358, 359; 422/148; 205/552
See application file for complete search history.

(56) References Cited

U.S. PATENT DOCUMENTS

| | | | | |
|---|---|---|---|---|
| 4,287,162 A | * | 9/1981 | Scheibel | 423/238 |
| 5,116,591 A | * | 5/1992 | Witter | 423/352 |
| 5,427,759 A | * | 6/1995 | Heitmann | 423/352 |
| 5,496,778 A | * | 3/1996 | Hoffman et al. | 29/25.01 |
| 5,846,385 A | * | 12/1998 | Chien | 196/98 |
| 6,001,223 A | * | 12/1999 | Hoffman et al. | 203/12 |
| 6,077,491 A | | 6/2000 | Cooper et al. | |
| 6,183,720 B1 | * | 2/2001 | Laederich et al. | 423/658.5 |
| 6,322,762 B1 | | 11/2001 | Cooper et al. | |
| 6,436,359 B1 | | 8/2002 | Spencer, III et al. | |
| 6,461,411 B1 | | 10/2002 | Watanabe et al. | |
| 2001/0010286 A1 | * | 8/2001 | Wostbrock et al. | 203/1 |
| 2002/0102197 A1 | * | 8/2002 | Cooper et al. | 423/235 |
| 2002/0146363 A1 | * | 10/2002 | Benderly et al. | 423/352 |
| 2003/0097932 A1 | | 5/2003 | Watanabe et al. | |
| 2003/0108473 A1 | * | 6/2003 | Dershowitz et al. | 423/352 |

* cited by examiner

*Primary Examiner*—Wayne A. Langel
(74) *Attorney, Agent, or Firm*—Townsend and Townsend and Crew, LLP (57) ABSTRACT

A system and method for generating, purifying, and using ultra-pure ammonia on-site, such as at a semiconductor manufacturing facility. The system includes an ammonia generation system configured to generate ammonia including carbon dioxide, water, and other impurities. A purification system is provided with the generation system in the manufacturing facility and is linked to the output of the generation system. The purification system processes the effluent from the ammonia generation system to remove substantially all of the carbon dioxide, water, and other impurities to produce an outlet stream of ultra-pure ammonia. The system further includes a point of use system provided at the same manufacturing facility to utilize the outlet stream of ultra-pure ammonia.

31 Claims, 3 Drawing Sheets

ON-SITE GENERATION, PURIFICATION, AND DISTRIBUTION OF ULTRA-PURE ANHYDROUS AMMONIA

CROSS-REFERENCE TO RELATED APPLICATIONS

This application claims the benefit of U.S. Provisional Applicant No. 60/572,256, filed May 18, 2004, which is incorporated in its entirety herein by reference.

BACKGROUND OF THE INVENTION

1. Field of the Invention

This invention relates to the field of gas purification, and more specifically, to a system and process for on-site generation, purification, and distribution of ultra-pure ammonia.

2. Description of the Prior Art

As semiconductor integrated devices become smaller and the devices using semiconductor integrated devices become more sophisticated, there are increasing demands for the physical and chemical properties of the actual semiconductor material to have properties nearer to the ideal and intrinsic properties of the semiconductor material. The manufacture of semiconductors involves the use of reactive gases that are composed of various elements. In addition, manufacturing processes such as metal-organic chemical vapor deposition (MOCVD) and other related manufacturing techniques are used in the manufacture of semiconductors. In these processes, the purity of the reactive gases plays a large part in determining the resulting quality of the semiconductor device being manufactured, and in particular, the electronic quality and characteristics of the manufactured semiconductor device. Consequently, there is an increasing demand in the microelectronics industry for ultra-pure process gases, and to meet these demands, methods for ultra-purification of gases useful in microelectronics processes have experienced extensive technological effort and advances.

Ultra-pure ammonia is an example of the gases in demand by the semiconductor industry as the use of ultra-pure ammonia in semiconductor and compound semiconductor device manufacturing has gained ascendancy in the past decade. Specifically, ultra-pure ammonia is used in nitride manufacturing processes for the production of high brightness blue and white LEDs (light emitting diodes), high performance optoelectronics, and other electronic devices. As device geometries continue to shrink and LED brightness demands increase, the need for continued contaminant level reduction as well and consistent delivery quality is likely to remain critical to manufacturing capacities and yields. Adding complexity to ammonia delivery installations is the recent need to sustain high flow rates. To aid this trend, ammonia delivery systems have moved from cylinder quantities, e.g., with a nominal capacity of about 23 kg and ton container quantities, e.g., with a nominal capacity of 220 kg, to ISO (International Organization of Standardization) module quantities having much larger capacities, e.g., up to 15,000 kg or larger capacity.

Certain large manufacturers are embarking on greater use quantities that will quickly reach the practical limitations of existing ultra-pure ISO module deliveries. Maintaining purity in high flow systems from the large containers to the use points is problematic in that frequent connections, module change-outs, and purge sequences are required. Multiple ISO modules are necessary to meet flow demands and as such large abatement systems are required to mitigate release scenarios. Additionally, regulating authorities are imposing strict permitting processes, including complete building containment and abatement of ISO module quantities. An alternative large volume supply scenario includes stationary storage tanks from which raw ammonia is delivered to the site, purified, and distributed to the use points. This eliminates the large rolling stock of high purity ISO modules and also reduces the contamination potential at trailer connection and disconnection. However, the abatement and permitting requirements are still gating or limiting factors in this type of installation that prevent these installations from meeting the growing demands for ultra-pure ammonia.

There are several chemical processes that are used to manufacture ammonia. The three most prevalent methods include the Haber-Bosch process, indirect electrochemical dissociation, and urea decomposition. The Haber-Bosch process reacts gaseous hydrogen and nitrogen over a metal catalyst at high temperatures (e.g., at 475° C.) and pressures (e.g., at 20 MPa). This process is a proven large-scale industrial process; however, it uses harsh conditions and has not been proven technically or economically effective below the ton/hour range. The electrochemical dissociation process has been proposed by some in the semiconductor industry as an alternative to the Haber-Bosch process for the generation of ammonia. This process also reacts hydrogen and nitrogen. However, it is an indirect synthesis via a molten alkali-metal halide electrolyte with nitrogen introduced at the cathode and hydrogen introduced at the anode. The electrochemical dissociation process also operates at elevated temperatures (e.g., at 400° C.) but at ambient pressure. While utilizing less harsh operating conditions or parameters than the Haber-Bosch process, the electrochemical dissociation process has not been proven above pilot scale production rates and has a high risk of alkali metal contamination. Another concern with adopting these two processes for generating ultra-pure ammonia it that the Haber-Bosch and electrochemical distribution processes require large amounts of hydrogen, which adds significantly to the risk of operating an ammonia generation facility. Another process for generating ammonia is through the dissociation of urea. Although this reaction has been known in the art, it has recently been incorporated into a complete packaged plant designed for abatement systems for NOx reduction but has not been tested or used for the production of ultra-pure ammonia in the semiconductor industry.

Hence, there remains a need for improved methods and systems for generating ultra-pure ammonia for use in the semiconductor and other industries. Preferably, such methods and systems would be configured to meet the increasing demand for high flow rates of ammonia while also providing a safer operating facility that requires less abatement controls.

SUMMARY OF THE INVENTION

This invention provides a novel method and system for producing and delivering high-flow, ultra-pure ammonia for manufacturing semiconductor and compound semiconductor devices. The method of the present invention eliminates the need for large delivery containers or stationary storage tanks by providing an on-site process for generating ammonia, which is subsequently fed into an on-site downstream purification system that is fluidly connected on-site to an ammonia generating reactor.

More specifically, this invention provides a method for on-site generation and purification of ultra-pure ammonia that includes generating ammonia in a reactor, thereby producing a first effluent comprising ammonia and impurities. Methods of producing the ammonia may include, but are not limited to, catalytic on-site ammonia generation, electrochemical on-site ammonia generation, and on-site hydrolysis of urea. To purify the generated ammonia, the method includes transferring the first effluent to a purification process and purifying the ammonia, such as to a purity level greater than 99%.

In one preferred embodiment of this invention, the first effluent is transferred to a first absorption apparatus fluidly connected to the reactor. In this embodiment, the method continues with absorbing the first effluent to provide a first overhead fraction of carbon dioxide and minor amounts of ammonia and water and a first bottom fraction including ammonia, water, minor amounts of carbon dioxide, and trace levels of impurities. The method further includes transferring the first bottom fraction to a first distillation apparatus fluidly connected to the first absorption apparatus. The first bottom fraction is distilled to provide a second overhead fraction including ammonia having minor amounts of water and trace levels of impurities and a second bottom fraction of water and minor amounts of ammonia.

The method continues with flowing the second overhead fraction through a first purification system fluidly connected to the first distillation apparatus. The first distillation apparatus includes a first purifier material to provide as output a second effluent of ammonia having less than about 10,000 ppm water and preferably, less than about 100 ppm water along with minor amounts of carbon dioxide and trace levels of other impurities. The method further includes flowing the second effluent through a second purification system fluidly connected to the first purification system. The second purification system includes a second purifier material to provide a third effluent of ammonia having less than 10,000 ppm water and preferably, less than about 5 ppm water with minor amounts of carbon dioxide and trace levels of other impurities.

The method continues with transferring the third effluent to a second distillation apparatus fluidly connected to the second purification system, and then, distilling the third effluent to provide a third overhead fraction. The third overhead fraction is made up of carbon dioxide and minor amounts of impurities. A third bottom fraction is also generated from the second distillation apparatus which includes ammonia having less than about 10,000 ppm water and preferably, less than about 5 ppm, less than 40 ppm carbon dioxide and preferably, less than about 0.4 ppm carbon dioxide, and also less than about 200 ppm other impurities, and preferably, less than about 2 ppm other impurities.

Next, the method includes flowing the third bottom fraction through a third purification system fluidly connected to the second distillation apparatus containing a third purifier material so as to provide a fourth effluent of ammonia having less than about 10,000 ppm water and preferably, less than about 200 ppb water. The fourth effluent also includes less than about 40 ppm carbon dioxide and preferably, less than about 0.4 ppm carbon dioxide, and less than about 200 ppm other impurities and preferably, less than about 2 ppm impurities. The ultra-pure ammonia generation method then further includes flowing the fourth effluent through a fourth purification system fluidly connected to the third purification system. The fourth purification system includes a fourth purifier material to provide the desired output of ultra-pure ammonia having less than about 10,000 ppm water and preferably, less than about 100 ppb water, less than about 40 ppm carbon dioxide and preferably, less than about 0.4 ppm carbon dioxide, and also less than about 200 ppm other impurities and preferably, less than about 2 ppm other impurities.

According to another aspect of the invention, a method, and corresponding system, is provided for generating ultra-pure ammonia for on-site use. The method includes operating a reactor (or other generating device or devices) to generate an effluent at the reactor outlet of ammonia and impurities, which may vary on the configuration of the reactor. The method continues with receiving the reactor effluent at an inlet of a purification system that is connected to the reactor outlet. The received first effluent is processed with the purification system to remove substantially all of the impurities to produce an outlet stream of 99.0 percent or higher purity ammonia. Additionally, the method includes utilizing or consuming the outlet stream with a point of use system or device connected to the purification system. The reactor, the purification system, and the point of use system (or at least its inlet) are provided at a single facility, such as within the boundaries of a manufacturing facility or other facility which takes ultra-pure ammonia as an input. As will be appreciated by those skilled in the art, the specific ammonia generation technique and reactor configuration can be varied to practice the invention, and similarly, the purification system may take a number of forms to provide the desired purification functions.

For example, but not as a limitation, the processing of the first effluent with the purification system may include producing, with an absorption apparatus, a bottom fraction of ammonia, water, minor amounts of carbon dioxide, and trace levels of impurities. Then, with a first distillation apparatus, processing the absorption apparatus bottom fraction to produce an overhead fraction of ammonia having minor amounts of water and trace levels of impurities. This exemplary processing further includes using a first purification device or apparatus to cause the overhead fraction from the distillation apparatus to flow through purifier material to produce a second effluent of ammonia having less than about 10,000 ppm water, minor amounts of carbon dioxide, and trace levels of impurities. The second effluent is provided as the outlet stream of the purification system.

In some cases, the above-described processing is supplemented with additional steps including using a second purification device to produce a third effluent of ammonia having less than 5 ppm water by flowing the second effluent through more purifier material. Then, with a second distillation apparatus, the third effluent is processed to produce a bottom fraction of ammonia having less than about 10,000 ppm water, less than about 40 ppm carbon dioxide, and less than about 200 ppm other impurities. The processing may further include using a third purification device to create a fourth effluent of ammonia having less than about 100 ppb water, less than about 0.4 ppm carbon dioxide, and less than about 2 ppm other impurities by forcing the bottom fraction from the second distillation apparatus to flow through purifier material. Then, if desired, a fourth purification device is used to flow the fourth effluent through additional purifier material to produce ultra-pure ammonia that is provided as the outlet stream to the point of use system.

DETAILED DESCRIPTION OF THE INVENTION

Figure 1:
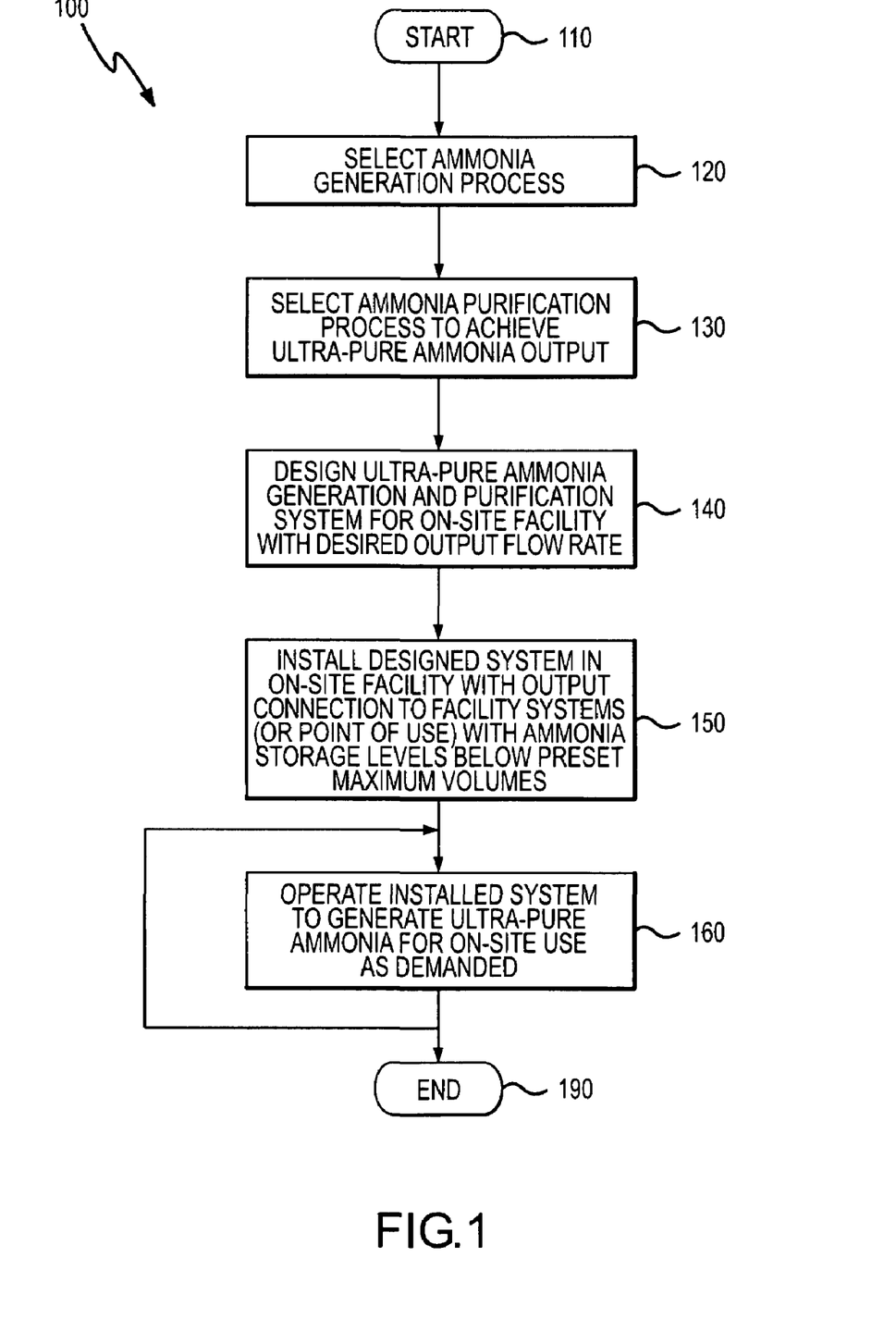
FIG. 1 illustrates an initiation process for an on-site ammonia generation and purification system according to the invention.

This invention provides a unique process for on-site ammonia generation with subsequent on-site purification to ultra-pure ammonia levels. FIG. 1 illustrates generally an initiation process 100 for an ultra-pure ammonia generation and purification process utilizing the ideas of the present invention. The method 100 starts at 110 such as with identifying a manufacturing or other facility in which ultra-pure ammonia is used and for which on-site generation would be useful, i.e., environmentally safer and less expensive than storing large amounts of ammonia in liquid form. As part of step 110, a desired flow rate or output rate may be determined to allow the generation steps and purification steps to be selected properly to support the need for ammonia, which in many facilities has become a relatively high (i.e., requiring ISO modules or the like to provide adequate storage of ammonia).

An initial step of the method of this invention is the generation of ammonia, and hence, the method 100 begins at 120 with the selection of an ammonia generation process. The specific generation method of ammonia generation selected at 120 is generally not a limiting feature of the invention as a number of techniques know in the art may be used to generate ammonia to practice the invention. In one preferred embodiment, the method 100 selects or utilizes a "urea-to-ammonia" generation process as described in U.S. Pat. Nos. 6,077,491; 6,322,762; and/or 6,436,359, each of which is specifically incorporated herein by reference. In other embodiments of the invention, the generation process selected at 120 for on-site ammonia generation includes, but is not limited to, an electrochemical reaction between hydrogen and nitrogen, by reacting gaseous hydrogen and nitrogen over a metal catalyst such as at an elevated temperature and pressure, e.g., at 475° C. and 20 MPa.

At 130, the method 100 continues with selection of an ammonia purification process for use in processing the output from the ammonia generation process to achieve a desired purity level or to provide ultra-pure ammonia output at desired flow rate. Although "ultra-pure" may be defined in a number of ways to practice the invention, generally the invention is considered to include an ammonia purification process selected at 130 for purifying raw ammonia from the generation process or system output to between 2N ("two nine's" or 99.0, a description well known in the art to designate purity levels) and 7N ("7 nines" or 99.99999) or higher levels of purity. One exemplary ammonia purification system configured to achieve such purity levels is described in detail below and shown as element 238 in FIG. 2.

At 140, an ultra-pure ammonia generation and purification system of the particular on-site facility is designed with a desired output flow rate and pressure to support point of use operations in the facility. In one embodiment, effluent exiting an ammonia reactor or the selected ammonia generation system is purified on-site with the selected purification process to remove $CO_2$ and water to produce an ultra-pure ammonia product (e.g., ammonia that is between 2N and 7N percent pure ammonia). To achieve ultra-pure ammonia, the system is designed at 140 such that in the initial purification steps formation of ammonium carbamate and/or ammonium carbonate is controlled or even prevented. These impurities can form if the purification system temperature is reduced to below 100° C. Hence, in one embodiment, the purification system is specifically designed to remove water and carbon dioxide at temperatures above those where ammonium carbamate and ammonium carbonate will form, i.e., the ammonia purification system (such as the components of system 238 of FIG. 2) are configured to operate at temperatures greater than about 100° C. In other embodiments such as those using urea to produce ammonia, reactor and initial purification components are maintained greater than about 100° C., e.g., with reference to FIG. 2, portions of the ammonia generation system 220, first absorption apparatus 240, the first distillation apparatus 250, and the first purification system 158 are kept at temperatures above 100° C. while in other embodiment fewer or additional components of the purification system are kept at elevated temperatures to better control the formation of undesired impurities.

At 150, the designed system is installed in the on-site facility with its output connected to on-site facility systems that utilized ammonia, such as a semiconductor production system. Typically, step 150 includes placing the output of the ammonia purification system with an inlet or input to an ammonia supply line or system previously installed in the facility. At 160, the installed system is operated to generate and purify ammonia to a desired purity level (such as 2N or greater purity) at a rate that provides a desired input flow rate to the facility's ammonia supply system. Preferably, there is no or minimal storage of ammonia, and particularly, ammonia as a liquid, to eliminate the need for additional safety and environmental systems, e.g., ammonia is not stored in volumes triggering governmental regulations concerning storage, distribution, and use of ammonia such as OSHA PMS requirements or EPA RMP requirements in the United States. The method 100 continues with ongoing operation of the system to supply on-site ammonia needs of the facility system(s) or ends at 190.

Figure 2:
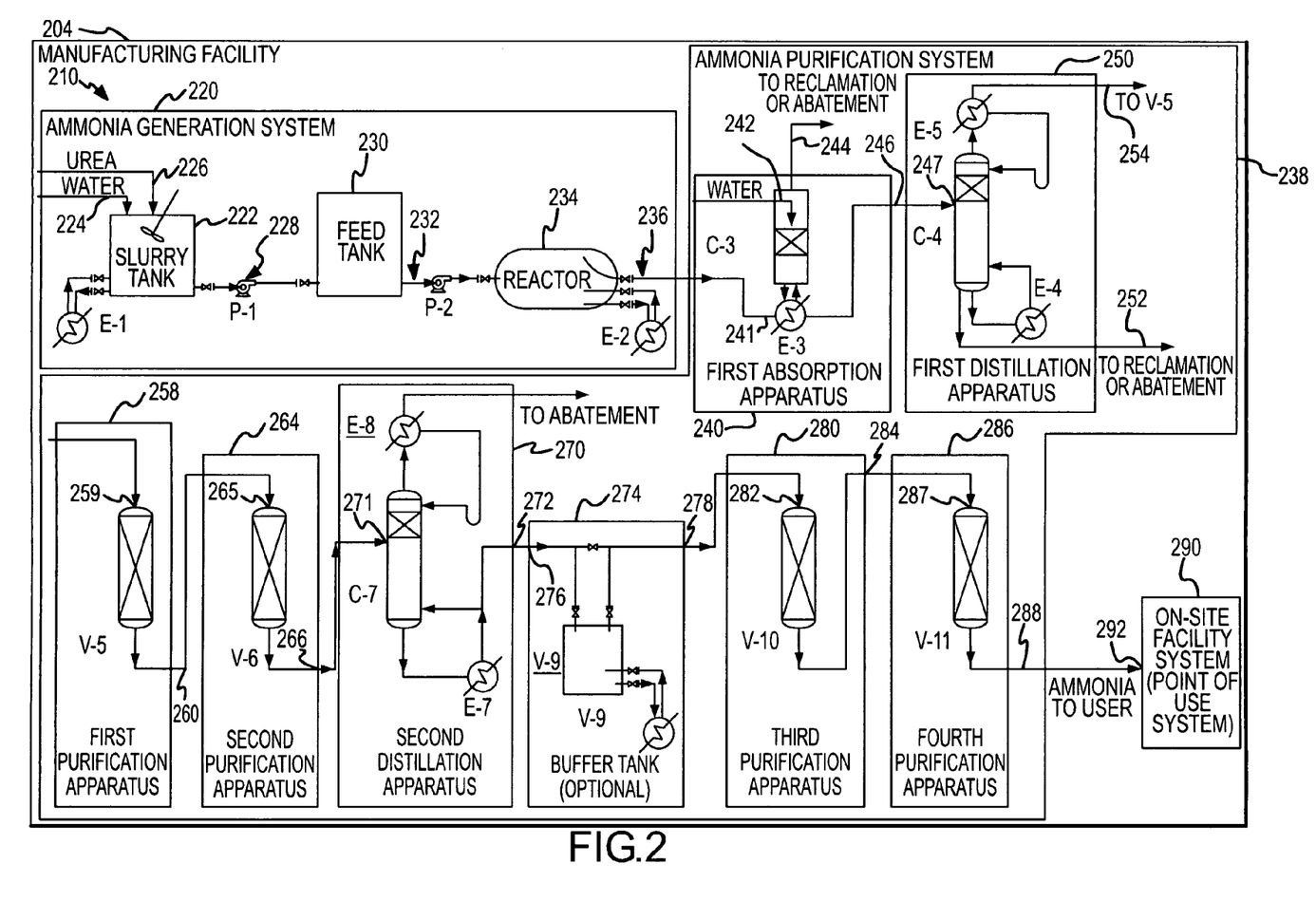
FIG. 2 illustrates an ultra-pure ammonia generation and purification system according to one embodiment of the invention and as may be created as part of the process of FIG. 1.

With an understanding of how on-site ammonia generation and purification can be achieved to support ultra-pure ammonia users, an exemplary system 210 and its operation are explained with reference to FIGS. 2 and 3. As shown in FIG. 2, a manufacturer's (or other type of) facility 204 is shown to house or include the ultra-pure ammonia generation and purification system 210. Generally, the system 210 includes an ammonia generation system 220 in fluid communication with an ammonia purification system 238 that is in turn in fluid communication with an on-site facility or point of use system 290 (e.g., an ultra-pure ammonia supply line or system). The system 210 may be operated to perform the ammonia generation and purification method 300 shown in FIG. 3, which typically starts with installation of the system 210 and connection of the output of the purification system 238 with the on-site facility system 290 input 292. The process 300 may also start at 304 with providing any necessary input connections to the ammonia generation system 220.

The method 300 continues at 310 with on-site generation of ammonia by operating ammonia generation system 220. As discussed with reference to FIG. 1, the ammonia generation system 220 may take a number of forms that are readily understood by those skilled in the art. In one preferred embodiment, the ammonia generation system 220 takes the form shown in FIG. 2. According to one embodiment, dry urea (a non-hazardous solid) is delivered via feed 226 to a slurry tank or water dissolver 222 along with a volume of water via feed 224 and a urea slurry is formed in tank 222. The water via feed 224 can be standard, deionized, or ultra-pure water. Ultra-pure water in this application is defined as water having at least about 10 mega-ohm resistivity and up to about 10 ppt metal contamination and which has been purified via UA, ion exchange resins, carbon beds, reverse osmosis, and/or nanofiltration. In another embodiment, a urea liquor (50-70% urea by weight) is used as a feedstock via line 226 with line 224 not being required. The slurry is pumped via connecting line 228 to a feed tank 230 and then, via connecting line 232 to a reactor 234. In the reactor, the urea slurry is dissociated into ammonia and carbon dioxide. In one embodiment, the reactor 234 is run at a temperature of less than about 150° C. (plus or minus 30° C.) and a pressure up to about 2.5 MPa. The reactor effluent at the outlet 236 (or outlet line) typically includes ammonia, carbon dioxide and water and can be considered the downstream boundary of the ammonia generation system 220 or urea-to-ammonia process.

As shown, the outlet 236 of the ammonia generation system 220 is connected to the inlet 241 of the ammonia purification system 238, and more specifically, to the first component or stage of the purification system 238, which in the illustrated embodiment is a first absorption apparatus 240. Hence, the method 300 continues at 320 with the initiation of the steps used to provide ultra-pure ammonia at the inlet 292 of the point of use system 290. As shown in FIG. 2, the reactor effluent from the generation of ammonia in system 220 is transferred from the reactor 234 to an inlet 241 of an absorption apparatus 240 that is fluidically connected on-site 204 to the outlet 236 of the reactor 234 (or generation system 220). Step 320 can employ a simple quench apparatus without reflux for absorption apparatus 240 or another device useful for absorption. In such an embodiment, heat may be provided by the feed stream (i.e., the reactor effluent) and cooling may be provided by a condenser and additional water supplied via input line 242 to the apparatus 240 via, for example, spray nozzles. The first absorption apparatus 240 produces a first overhead fraction of carbon dioxide containing minor amounts of ammonia and a first bottom fraction of ammonia, water, minor amounts of carbon dioxide and trace levels of impurities. The first overhead fraction can be transferred via line 244 for abatement or for collection for further purification to produce commercial grade carbon dioxide.

The method 300 continues with a first distillation process 326. During operation of the purification system 238, the first bottom fraction from the first absorption apparatus 240 is transferred via output 246 to an inlet 247 of a first distillation apparatus 250 that is fluidly connected on-site to the first absorption apparatus 240. The first distillation apparatus 250 may take a number of forms to practice the invention and in one embodiment is a standard fractional distillation apparatus, e.g., an apparatus having a single feed, a bottom fraction reboiler, an overheat fraction condenser, and a multistage distillation column. The first distillation apparatus 250 produces a second overhead fraction including ammonia having minor amounts of water and trace levels of impurities and a second bottom fraction including water and minor amounts of ammonia. The second bottom fraction can be recycled via output 252 to either a dissolution tank or an intermediate holding tank (not shown) (e.g., to a reclamation or abatement process).

The method 300 continues at 330 by using a purifier material to complete a first purification of the generated ammonia. To this end, the second overhead fraction from the first distillation apparatus 250 is output from an outlet or outlet line 252 to a first purification apparatus 258. The ammonia or second overhead fraction is forced to flow through the first purification system 258 that is fluidly connected at its inlet 259 to the first distillation apparatus 250. The first purification system 258 is configured to direct the second overhead fraction or received ammonia through a purifier material (or first purifier material), such as, but not limited to, one or more of carbon, polymer materials, aluminas, silicas, molecular sieves, silica gel, zeolites, or any other material capable of sorbing moisture. In step 330, bulk water is removed to produce a second effluent of ammonia having less than about 10,000 ppm water, minor amounts of carbon dioxide, and trace levels of impurities. In a preferred embodiment, the amount of water in the second effluent at the outlet 260 of the first purification apparatus 258 is less than about 100 ppm.

The method 300 continues at 340 with processing the ammonia or second effluent with a second purification apparatus 264 to complete a second purification. As shown in FIG. 2, the second effluent from the first purification apparatus 258 is directed to flow through a second purification apparatus or system 264 that is fluidly connected on-site to the first purification system outlet 260 at inlet 265. The second purification apparatus 264 is configured to contain and flow effluent through a second purifier material, such as, but not limited to, one or more of carbon, polymer materials, silicas, molecular sieves, activated alumina, or modified alumina (e.g., a modified alumina as described in U.S. Pat. No. 6,461,411 to Watanabe et al., and U.S. Publication No. 2003/0097932 to Watanabe et al., each of which is incorporated herein by reference) or any other material capable of sorbing moisture. The second purification apparatus 264 produces a third effluent at its outlet 266 of ammonia having less than about 10,000 ppm water, minor amounts of carbon dioxide, and trace levels of impurities. In one preferred embodiment, the amount of water in the second effluent is less than about 5 ppm.

The method 300 further includes performing a second distillation of the ammonia stream. The third effluent from outlet 266 is transferred to an inlet 271 of a second distillation apparatus 270 that is fluidly connected on-site 204 to the second purification apparatus 264. The second distillation apparatus 270 can be similar to that used in the first distillation (i.e., similar or the same as apparatus 250). The distillation apparatus 270 is selected or configured to produce a third overhead fraction of carbon dioxide and minor amounts of impurities and to produce a third bottom fraction of ammonia having less than about 10,000 ppm water, less than about 40 ppm carbon dioxide, and less than about 200 ppm other impurities. In one preferred embodiment, the third bottom fraction is made up of ammonia having less than about 5 ppm water, less than about 0.4 ppm carbon dioxide, and less than about 2 ppm impurities. In an optional step at 360, third bottom fraction from the second distillation apparatus 270 can be transferred to a buffer tank 274, which has an inlet 276 connected to distillation apparatus outlet 272, prior to being purified by another or third purifier material. The buffer tank 274 is fluidly connected downstream from the second distillation apparatus 270 and upstream from a third purification system 280. The sample deferred to the buffer tank 274 can be used for analysis and to monitor flow conditions at 360.

The method 300 continues at 370 with processing the third bottom fraction or on-site generated ammonia stream to complete a third purification. As shown in FIG. 2, the third bottom fraction is flowed through a third purification system 280 fluidly connected on-site to the second distillation apparatus 270 at an inlet 282 directly to outlet 272 or via buffer tank 274 and its inlet and outlets 276, 278. The third purification apparatus 280 is configured to contain a third purifier material through which the received third bottom fraction or ammonia stream is passed. The purifier material may be or include, but is not limited to, carbon, polymer materials, aluminas, silicas, modified alumina, and/or any other material capable of sorbing moisture. The third purification apparatus 280 provides at its output 284 a fourth effluent of ammonia having less than about 10,000 ppm water, less than about 40 ppm carbon dioxide, and less than about 200 ppm other impurities. In one preferred embodiment, the fourth effluent is ammonia having less than about 100 ppb water, less than about 0.4 ppm carbon dioxide, and less than about 2 ppm other impurities. For some applications, the output of the third purification apparatus 280 may be provided to the inlet 292 of an on-site point of use system 290 as ammonia at an acceptable or desired minimum purity level.

Figure 3:
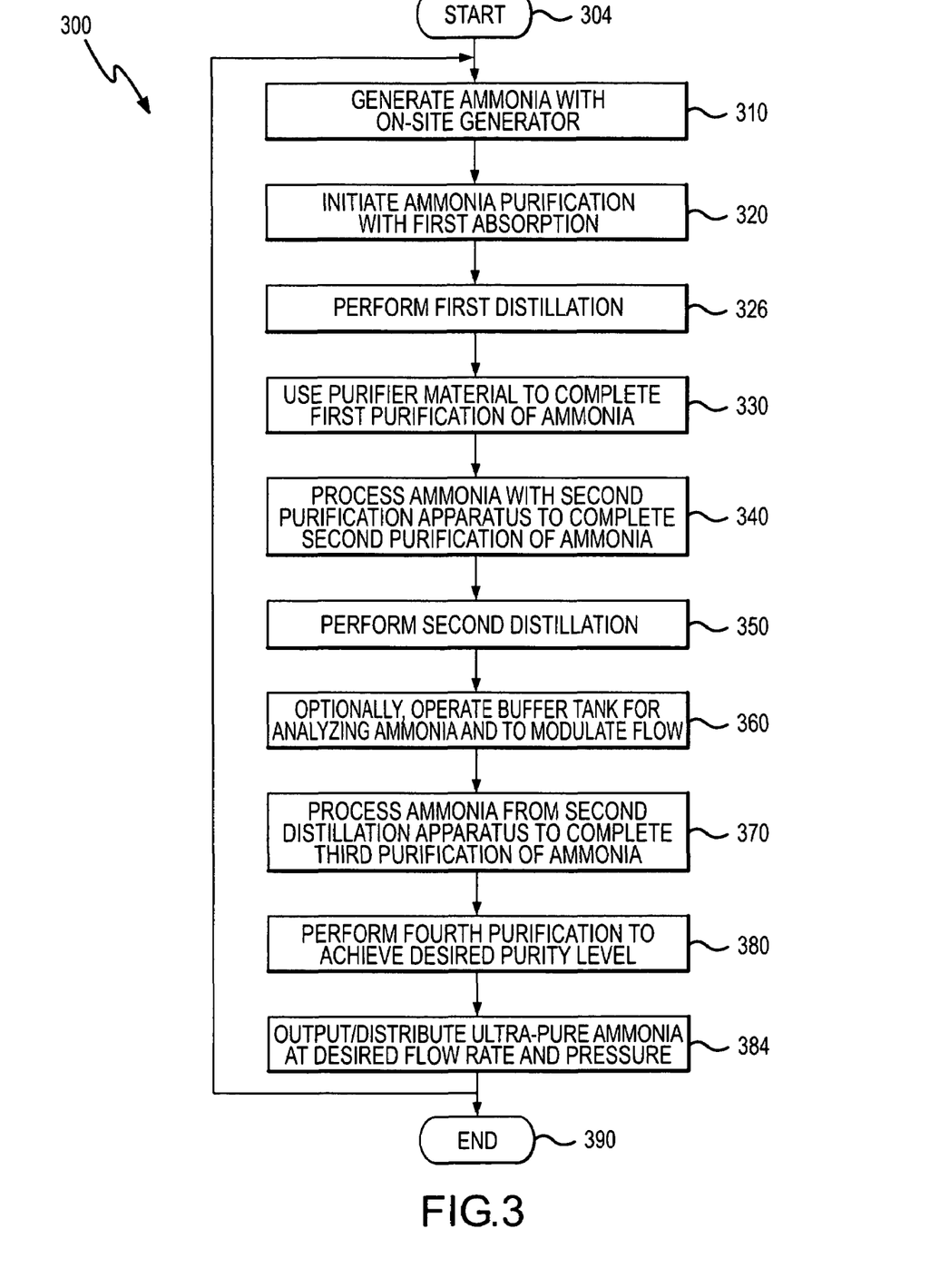
FIG. 3 illustrates an ultra-pure ammonia generation and purification method such as may occur during operation of the system shown in FIG. 2.

In other embodiments as shown in FIGS. 2 and 3, the method 300 continues at 380 with the performance of a fourth purification to achieve a higher purity level or a desired ultra-pure ammonia output stream from the purification system 238. As shown in FIG. 2, the fourth effluent is transmitted from the output 284 of the third purification apparatus 280 to flow through a fourth purification system 286 fluidly connected on-site at its inlet 287 to the third purification system 280. The fourth purification system 286 is configured to hold a fourth purifier material, such as but not limited to, one or more of carbon, polymer materials, aluminas, silicas, molecular sieves, silica gel, and/or zeolites. In some cases, the fourth purifier material in the apparatus 286 includes reactive inorganic or organic functional groups dispersed on or within these listed purifier materials or is any other material capable of sorbing moisture. Nanochem™ purification materials, which are produced and distributed by Matheson Tri-Gas, Inc. (see, e.g., www.Matheson-TriGas.com for additional availability of these purifier materials for use in the purification apparatus 286), are examples of such purifier materials. Such purification materials can provide at the output 288 of purification apparatus 286 ultra-pure ammonia having less than about 10,000 ppm water, less than about 40 ppm carbon dioxide, and less than about 200 ppm other impurities. The effluent from the fourth purification step can then be distributed via pipeline 292 to customer use points 290. Significantly, the flow rate of the ammonia the purification system outlet 288 (or point of use inlet 292) can be controlled to support a desired ammonia usage by system 290 and also to avoid the need for storage (i.e., to provide a just-in-time supply of ultra-pure ammonia). The flow rate at 288, for example, may be in the range of 10 to 50 pounds an hour to in excess of 800 pounds an hour. Of course, several analytical sample points may be distributed throughout the purification processes described above to monitor and control the downstream purity at point of use inlet 292 and other points within the purification system 238.

In addition to the purification and distillation steps described previously, it is possible that other purification methods and techniques could be implemented in the invention. Purification methods such as membrane separations, gas/liquid traps, and cryogenic traps can be used to reduce the various impurities in the ammonia fluid stream.

The above-described method of on-site generation, purification and distribution of ultra-pure ammonia, in which the ammonia generation apparatus and the purification systems are all located on-site and are fluidly connected in series, is suitable in particular for semiconductor and compound semiconductor device fabrication.

With the above description of the invention understood, it may be useful to discuss some of the advantages provided by the method and system of the invention. The invention facilitates minimization or elimination of ammonia storage necessary in prior systems to support the distribution of ultra-pure ammonia. The on-site techniques of the invention help eliminate potential environmental consequences associated with connecting and disconnecting transportable containers encountered when ammonia is delivered from a liquid source, i.e., the method and system of the invention does not require storage or handling of liquid ammonia sources. Additionally, the invention eliminates the potential catastrophic consequences of a complete release of ISO module quantities of ammonia encountered when ammonia is delivered from a liquid source and particularly, a large source used to meet high flow rates. The methods and systems of the invention reduce (or even eliminate) ammonia storage on-site to levels that do not trigger OSHA PMS requirements in the support of distribution of ultra-pure ammonia and that do not trigger EPA RMP requirements in the support of distribution of ultra-pure ammonia.

The invention further facilitates minimization or elimination of the amount of enclosed space abatement required in the support of distribution of ultra-pure ammonia. The invention supports delivery of consistent product quality by eliminating non-condensable contaminant fluctuation encountered when ammonia is vaporized from a liquid source. To support demands for high flow rates, the invention provides delivery of consistent product flow rates by eliminating the need to counter the heat of vaporization encountered when ammonia is delivered and vaporized from a liquid source. Also, the invention provides delivery of consistent product quality by eliminating the contribution of container contamination encountered when ammonia is delivered and vaporized from a liquid source. The methods and systems of the invention provide a technologically sound, economically feasible process that significantly reduces the risks involved with ammonia usage by eliminating bulk container transport, transloading, disconnection, and connection of bulk containers and large storage tanks. The invention allows high volume ammonia usage in venues that do not permit bulk storage of liquid ammonia. Yet further, the systems and methods of the invention eliminate or reduce potential contamination due to connection and disconnection of bulk sources.

The on-site generation/purification process is generally a continuous one and therefore, is not subject to batch-to-batch variations as is the case in bulk portable tanks. The inventive process can readily be adapted to provide real time SPC or monitoring data for the on-site operator's use. The inventive process can accommodate potential changes in final effluent quality with readily implemented changes of operating parameters that is not possible with traditional delivery systems using liquid ammonia sources. Additionally, the inventive system, such as that shown in FIG. 2, can be provided as a configuration of skid units that can be decoupled and installed in different locations within an on-site facility to support space planning (i.e., dissolver tanks near road access, reactor apparati on the roof or basement, purifier skids closer to use points, and the like).

As will be appreciated by those skilled in the art, the coupling of on-site ammonia generation with purification to provide ultra-pure ammonia is a step change in the industry. Generating ammonia on-site is attractive to high volume users, as it minimizes the risk and exposure present as larger delivery and storage tanks are needed. On-site generation will impact the GaN users in the LED market as well as the LCD-TFT markets.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow. The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

We claim:

1. A method for on-site generation and purification of ultra-pure ammonia, comprising:
    generating ammonia in a reactor to produce a first effluent comprising ammonia and impurities;
    processing the first effluent with an absorption apparatus fluidly connected to the reactor to produce a bottom fraction comprising ammonia, water, minor amounts of carbon dioxide and trace levels of impurities;
    processing the absorption apparatus bottom fraction with a first distillation apparatus fluidly connected to the absorption apparatus to produce an overhead fraction comprising ammonia having minor amounts of water and trace levels of impurities;
    flowing the overhead fraction from the first distillation apparatus through a first purification system containing a first purifier material and fluidly connected to said first distillation apparatus to produce a second effluent comprising ammonia having less than about 10,000 ppm water, minor amounts of carbon dioxide, and trace levels of impurities;
    flowing the second effluent through a second purification system containing a second purifier material and fluidly connected to the first purification system to produce a third effluent comprising ammonia having less than about 10,000 ppm water, minor amounts of carbon dioxide, and trace levels of impurities;
    processing the third effluent with a second distillation apparatus fluidly connected to the second purification system to produce a bottom fraction comprising ammonia having less than about 10,000 ppm water, less than about 40 ppm carbon dioxide, and less than about 200 ppm other impurities;
    flowing the bottom fraction from the second distillation apparatus through a third purification system containing a third purifier material and fluidly connected to the third distillation apparatus to provide a fourth effluent comprising ammonia having less than about 10,000 ppm water, less than about 40 ppm carbon dioxide and less than about 200 ppm other impurities; and
    flowing the fourth effluent through a fourth purification system containing a fourth purifier material and fluidly connected to the third purification system to produce ultra-pure ammonia having less than about 10,000 ppm water, less than about 40 ppm carbon dioxide, and less than about 200 ppm other impurities; and
    flowing the fourth effluent through a fourth purification system containing a fourth purifier material and fluidly connected to the third purification system to produce ultra-pure ammonia having less than about 10,000 ppm water, less than about 40 ppm carbon dioxide, and less than about 200 ppm other impurities.

2. The method of claim 1, wherein said ammonia is generated by hydrolyzing urea in aqueous solution in a closed reactor to generate a first effluent comprising ammonia, carbon dioxide, and water.

3. The method of claim 2, wherein said urea is dry urea.

4. The method of claim 2, wherein said urea is an aqueous solution comprising 50-70% urea.

5. The method of claim 2, wherein said reaction occurs below about 150° C. and below about 2.5 MPa.

6. The method of claim 1, wherein said ammonia is generated by an electrochemical reaction between hydrogen and nitrogen.

7. The method of claim 1, wherein said ammonia is generated by reacting gaseous hydrogen and nitrogen over a metal catalyst at 475° C. and 20 MPa.

8. The method of claim 1, wherein said first purifier material is at least one material selected from the group consisting of molecular sieves, silica gel, and zeolites.

9. The method of claim 1, wherein said second purifier material is at least one material selected from the group consisting of molecular sieves, activated alumina, or modified alumina.

10. The method of claim 1, wherein said third purifier material is modified alumina.

11. The method of claim 1, wherein the produced ultra-pure ammonia has a purity level greater than about 99.0 percent, wherein the produced ultra-pure ammonia is provided to an inlet of a point of use system in fluid communication with the fourth purification system, and wherein the reactor, the point of use system, and components for performing the processing and the flowing steps are contained in a manufacturing facility, whereby the produced ultra-pure ammonia is generated, purified, and used on a single on-site.

12. The method of claim 1, wherein the second effluent comprises less than about 100 ppm water, and the third effluent comprises less than about 5 ppm water.

13. The method of claim 1, wherein the fourth effluent comprises less than about 100 ppb water, less than about 0.4 ppm carbon dioxide, and less than about 2 ppm other impurities.

14. An on-site ultra-pure ammonia generation system, comprising:
    an ammonia generation system comprising a reactor generating a first effluent at an outlet, the reactor effluent comprising ammonia, carbon dioxide, and water; and
    a purification system with an inlet connected to the reactor outlet for receiving the first effluent, wherein the purification system processes the first effluent to remove substantially all of the carbon dioxide and the water to produce an outlet stream comprising 99.0 percent or greater purity ammonia; and
    a point of use system adapted for utilizing the outlet stream and having an ammonia input fluidically connected to the purification system to receive the ammonia outlet stream, wherein the ammonia generation system, the purification system, and the point of use system are housed in a manufacturing facility.

15. The system of claim 14, wherein the purification system comprises:
    an absorption apparatus fluidly connected to the reactor outlet operable to produce a bottom fraction comprising ammonia, water, minor amounts of carbon dioxide and trace levels of impurities;

a first distillation apparatus fluidly connected to the absorption apparatus adapted for processing the absorption apparatus bottom fraction to produce an overhead fraction comprising ammonia having minor amounts of water and trace levels of impurities; and a first purification device containing a first purifier material and fluidly connected to said first distillation apparatus through which the overhead fraction from the first distillation apparatus is forced to flow to produce a second effluent comprising ammonia having less than about 10,000 ppm water, minor amounts of carbon dioxide, and trace levels of impurities.

16. The system of claim 15, the purification system further comprising:

a second purification device containing a second purifier material and fluidly connected to the first purification device, wherein the second effluent flows through the second purifier material to produce a third effluent comprising ammonia having less than about 5 ppm water;

a second distillation apparatus for processing the third effluent fluidly connected to the second purification device to produce a bottom fraction comprising ammonia having less than about 10,000 ppm water, less than about 40 ppm carbon dioxide, and less than about 200 ppm other impurities;

a third purification device containing a third purifier material and fluidly connected to the third distillation apparatus, wherein the bottom fraction from the second distillation apparatus flows through the third purifier material to provide a fourth effluent comprising ammonia having less than about 100 ppb water, less than about 0.4 ppm carbon dioxide, and less than about 2 ppm other impurities; and a fourth purification device containing a fourth purifier material and fluidly connected to the third purification device, wherein the fourth effluent is caused to flow through the fourth purifier material to produce the ultra-pure ammonia.

17. The system of claim 14, wherein the purification system processes the first effluent at a temperature greater than about 100° C. to limit formation of ammonium carbamate and ammonium carbonate.

18. A method for on-site generation and purification of ultra-pure ammonia, comprising:

generating ammonia in a reactor to produce a first effluent comprising ammonia;

processing the first effluent with an absorption apparatus fluidly connected to the reactor to produce a bottom fraction comprising ammonia, water, and carbon dioxide;

processing the absorption apparatus bottom fraction with a first distillation apparatus fluidly connected to the absorption apparatus to produce an overhead fraction comprising ammonia having minor amounts of water;

flowing the overhead fraction from the first distillation apparatus through a first purification system containing a first purifier material and fluidly connected to said first distillation apparatus to produce a second effluent comprising ammonia having less than about 10,000 ppm water and carbon dioxide; and outputting the ammonia from the first purification system to an inlet of a point of use system, wherein the point of use system, the reactor, the absorption apparatus, the first distillation apparatus, and the first purification system are provided at a single manufacturing facility, whereby the point of use system is supplied with purified ammonia without requiring storage and handling of liquid ammonia sources.

19. The method of claim 18, further comprising prior to the outputting:

flowing the second effluent through a second purification system containing a second purifier material and fluidly connected to the first purification system and provided at the manufacturing facility to produce a third effluent comprising ammonia having less than about 5 ppm water;

processing the third effluent with a second distillation apparatus provided at the manufacturing facility fluidly connected to the second purification system to produce a bottom fraction comprising ammonia having less than about 10,000 ppm water, less than about 40 ppm carbon dioxide, and less than about 200 ppm other impurities;

flowing the bottom fraction from the second distillation apparatus through a third purification system containing a third purifier material, provided at the manufacturing facility, and fluidly connected to the third distillation apparatus to provide a fourth effluent comprising ammonia having less than about 100 ppb water and less than about 0.4 ppm carbon dioxide; and flowing the fourth effluent through a fourth purification system containing a fourth purifier material, provided at the manufacturing facility, and fluidly connected to the third purification system to produce ultra-pure ammonia, wherien the ultra-pure ammonia is transmitted to the inlet of the point of use system.

20. The method of claim 18, wherein said ammonia is generated by hydrolyzing urea in aqueous solution in a closed reactor to generate a first effluent comprising ammonia, carbon dioxide, and water.

21. The method of claim 20, wherein said urea is dry urea.

22. The method of claim 20, wherein said urea is an aqueous solution comprising 50-70% urea.

23. The method of claim 20, wherein said reaction occurs below about 150° C. and below about 2.5 MPa.

24. The method of claim 18, wherein said ammonia is generated by an electrochemical reaction between hydrogen and nitrogen.

25. An on-site ultra-pure ammonia generation system, comprising:

an ammonia generation system comprising a system generating an effluent at an outlet, the reactor effluent comprising ammonia and impurities; and a purification system with an inlet connected to the reactor outlet for receiving the reactor effluent, wherein the purification system processes the reactor effluent to remove substantially all of the impurities to produce an outlet stream comprising 99.0 percent or greater purity ammonia, the purification system comprising:

an absorption apparatus fluidly connected to the reactor outlet operable to produce a fraction comprising ammonia, water, carbon dioxide and impurities;

a first distillation apparatus fluidly connected to the absorption apparatus adapted for processing the absorption apparatus fraction to produce a fraction comprising ammonia having minor amounts of water and trace levels of impurities; and a first purification device containing a first purifier material and fluidly connected to said first distillation apparatus through which the fraction from the first distillation apparatus is forced to flow to produce the outlet stream comprising ammonia having less than about 10,000 ppm water, minor amounts of carbon dioxide, and trace levels of impurities; and a point of use system adapted for utilizing the outlet stream and having an ammonia intake fluidically connected to the purification system to receive the ammonia outlet stream.

26. The system of claim 25, wherein the ammonia generation system, the purification system, and the point of use system are housed in a manufacturing facility.

27. The system of claim 25, the purification system further comprising:
a second purification system containing a second purifier material and fluidly connected to the first purification system, wherein effluent from the first purification system flows through the second purifier material to produce an effluent comprising ammonia having less than about 5 ppm water; and
a second distillation apparatus for processing the effluent from the second purification system and fluidly connected to the second purification system to produce a fraction making up the outlet stream comprising ammonia having less than about 10,000 ppm water, less than about 40 ppm carbon dioxide, and less than about 200 ppm other impurities.

28. The system of claim 27, the purification system further comprising:
a third purification system containing a third purifier material and fluidly connected to the second distillation apparatus, wherein the fraction from the second distillation apparatus flows through the third purifier material to provide an effluent comprising ammonia having less than about 100 ppb water, less than about 0.4 ppm carbon dioxide, and less than about 2 ppm other impurities; and
a fourth purification system containing a fourth purifier material and fluidly connected to the third purification system, wherein the effluent from the third purification system is caused to flow through the fourth purifier material to produce the ultra-pure ammonia of the outlet stream.

29. A method for generating ultra-pure ammonia for on-site use, comprising:
operating a reactor to generate a first effluent at an outlet of the reactor, the first effluent comprising ammonia and impurities;
receiving the first effluent at an inlet to a purification system connected to the reactor outlet;
processing the received first effluent with the purification system to remove substantially all of the impurities to produce an outlet stream comprising 99.0 percent or greater purity ammonia; and
utilizing the outlet stream from the purification system with a point of use system connected to the purification system, wherein the reactor, the purification system, and the point of use system are provided at a single facility.

30. The method of claim 29, wherein the processing of the first effluent comprises:
with an absorption apparatus fluidly connected to the reactor outlet, producing a bottom fraction comprising ammonia, water, minor amounts of carbon dioxide and trace levels of impurities;
with a first distillation apparatus fluidly connected to the absorption apparatus, processing the absorption apparatus bottom fraction to produce an overhead fraction comprising ammonia having minor amounts of water and trace levels of impurities; and
with a first purification device containing a first purifier material and fluidly connected to said first distillation apparatus, causing the overhead fraction from the first distillation apparatus to flow through the first purifier material to produce a second effluent comprising ammonia having less than about 10,000 ppm water, minor amounts of carbon dioxide, and trace levels of impurities, the outlet stream comprising the second effluent.

31. The method of claim 30, wherein the processing of the first effluent further comprises:
with a second purification device containing a second purifier material and fluidly connected to the first purification device, causing the second effluent to flow through the second purifier material to produce a third effluent comprising ammonia having less than about 5 ppm water;
with a second distillation apparatus connection to the second purification device processing the third effluent to produce a bottom fraction comprising ammonia having less than about 10,000 ppm water, less than about 40 ppm carbon dioxide, and less than about 200 ppm other impurities;
with a third purification device containing a third purifier material and fluidly connected to the third distillation apparatus, causing the bottom fraction from the second distillation apparatus to flow through the third purifier material to provide a fourth effluent comprising ammonia having less than about 100 ppb water, less than about 0.4 ppm carbon dioxide, and less than about 2 ppm other impurities; and
with a fourth purification device containing a fourth purifier material and fluidly connected to the third purification device, causing the fourth effluent to flow through the fourth purifier material to produce ultra-pure ammonia provided in the outlet stream.

* * * * *